(12) United States Patent
Foessing

(10) Patent No.: US 10,402,055 B2
(45) Date of Patent: Sep. 3, 2019

(54) METHOD FOR CONFIGURING AN ELECTRICAL DRIVE SYSTEM AND MACHINE

(71) Applicant: Lenze Automation GmbH, Aerzen (DE)

(72) Inventor: Otmar Foessing, Hameln (DE)

(73) Assignee: Lenze Automation GmbH, Aerzen (DE)

( * ) Notice: Subject to any disclaimer, the term of this patent is extended or adjusted under 35 U.S.C. 154(b) by 121 days.

(21) Appl. No.: 15/591,679

(22) Filed: May 10, 2017

(65) Prior Publication Data

US 2017/0329471 A1 Nov. 16, 2017

(30) Foreign Application Priority Data

May 11, 2016 (DE) .................. 10 2016 208 118

(51) Int. Cl.
| | |
|---|---|
| *G06F 17/30* | (2006.01) |
| *G06F 3/0484* | (2013.01) |
| *G06F 3/0482* | (2013.01) |
| *G05B 1/03* | (2006.01) |
| *G06F 3/0485* | (2013.01) |

(52) U.S. Cl.
CPC ............ *G06F 3/0482* (2013.01); *G05B 1/03* (2013.01); *G06F 3/0485* (2013.01); *G06F 3/04847* (2013.01)

(58) Field of Classification Search
CPC ........ H02P 27/047; H02P 27/08; H02P 23/14; H02P 23/0077; H02P 31/00; G05B 2219/33114; G05B 2219/33127; G05B 1/03; G06F 17/30864; G06F 17/30867; G06F 17/30554; G06F 17/3053; G06F 16/951; G06F 3/0482; G06F 3/04847; G06F 3/0485; G06Q 20/12; G06Q 30/02; G06Q 30/0625; G06Q 30/0633
See application file for complete search history.

(56) References Cited

U.S. PATENT DOCUMENTS

| | | | |
|---|---|---|---|
| 8,078,970 B1 | 12/2011 | Anderson | |
| 9,336,309 B2 * | 5/2016 | Wurzer | ................. G06F 16/951 |
| 9,471,709 B1 * | 10/2016 | Zinenko | ................ G06F 16/951 |
| 9,588,632 B1 * | 3/2017 | Amacker | ................ G06F 3/048 |
| 9,858,695 B2 * | 1/2018 | Kaplan | ..................... G09G 5/00 |
| 9,953,339 B2 * | 4/2018 | Allen | ................. G06Q 30/0244 |
| 2004/0260730 A1 * | 12/2004 | Iwama | ............. G06F 17/30876 |
| 2005/0251747 A1 * | 11/2005 | Dolling | .................. G06Q 10/10 715/713 |
| 2011/0265035 A1 | 10/2011 | Lepage et al. | |

(Continued)

OTHER PUBLICATIONS

Chang et al., Simplified swarm optimization with differential evolution mutation strategy for parameter search, 5 pages (Year: 2013).*

(Continued)

*Primary Examiner* — Thuy Dao
(74) *Attorney, Agent, or Firm* — Crowell & Moring LLP

(57) ABSTRACT

A method is provided for configuring an electrical drive system and a machine is provided that can execute such a method. In order to select and set drive system parameter values, it is possible here, when a selectable number exceeds a threshold value, to display a dialogue in which a search field for supporting the input is available.

9 Claims, 1 Drawing Sheet

(56) References Cited

U.S. PATENT DOCUMENTS

| | | | | |
|---|---|---|---|---|
| 2014/0114943 A1* | 4/2014 | Holenweger | ......... | G06F 16/951 |
| | | | | 707/706 |
| 2015/0310005 A1* | 10/2015 | Ryger | ............... | G06F 17/30011 |
| | | | | 707/706 |
| 2016/0188684 A1* | 6/2016 | Glover | .................. | G06F 16/951 |
| | | | | 707/722 |

OTHER PUBLICATIONS

Woodward et al., An optimal parameter analysis and GPU acceleration of the image receptive fields neural network approach, 5 pages (Year: 2012).*

* cited by examiner

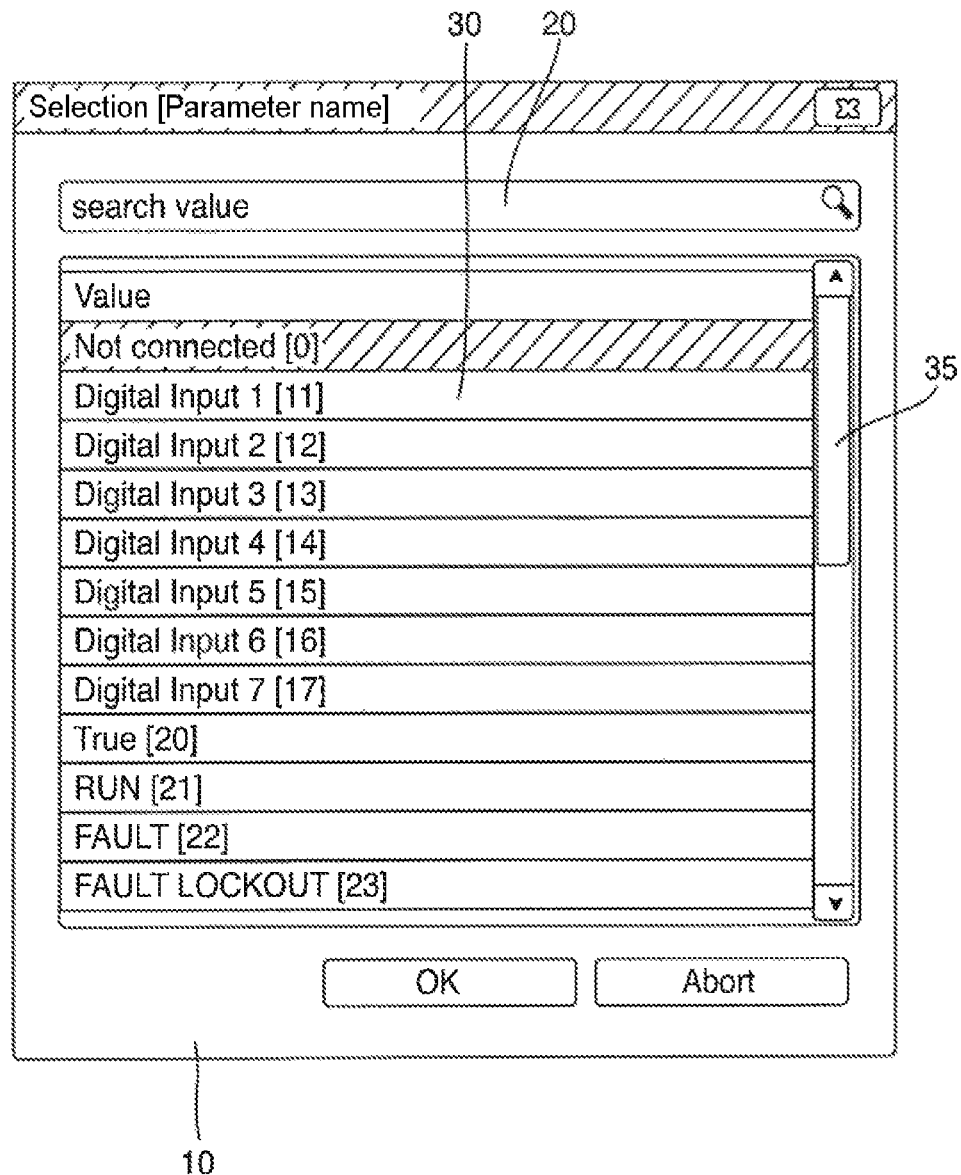

METHOD FOR CONFIGURING AN ELECTRICAL DRIVE SYSTEM AND MACHINE

FIELD OF THE INVENTION

The invention relates to a method for configuring an electrical drive system, wherein, in order to configure the electrical drive system, a parameter value is selected from a set of parameter values. The invention further relates to a machine, which has a control device, wherein the control device is configured to execute such a method.

BACKGROUND OF THE INVENTION

To date, when setting parameter values of electrical drive systems, surface controls that are appropriate for the parameter type have typically been used. Until now, a user-friendly graphical control or control element for parameters with a long list of textual selection possibilities (1 from n) has been lacking.

Up to this point, pull-down menus have been used, for example, in which, in a closed state, the current setting is displayed as text. Clicking on such a field using a mouse expands a selection list of all the possible selections or selection possibilities. After an entry has been selected, the field closes again.

This solution is typically suitable when the number of possible texts is small. With a larger number of texts, for example of more than 15, a scroll bar is often additionally added in the expanded list. However, this can lead to a situation in which the desired entry can only be found through laborious scrolling.

It is therefore an object of the invention to provide a method that allows simple input, even in the case of a larger number of selection possibilities. A further object of the invention is to provide a machine that is configured to execute such a method.

SUMMARY OF THE INVENTION

This and other objects are achieved in accordance with the invention by a method and a machine according to emobidments of the invention.

The invention relates to a method for configuring an electrical drive system, wherein, in order to configure the electrical drive system, a parameter value is selected from a set of parameter values of a drive system parameter, wherein the method has the following steps:

determining a number of parameter values that can be selected from the set, comparing the number with a threshold value, when the number is smaller than the threshold value or equal to the threshold value, displaying a list containing all the parameter values of the set, when the number is larger than the threshold value, displaying a dialogue containing a search field, wherein, when a character string is input into the search field, only those parameter values from the set that contain the character string are shown, receiving an input, which is assigned to a displayed parameter value, and selecting (and applying and optionally storing) the parameter value to which the input is assigned.

In the method according to the invention, a parameter value is selected from n possible or selectable parameter values for a drive system parameter that has a specific parameter type. The parameter values are presented to the user in text format or as text, for example, but are automatically typically of the integer data type (enumerated data type).

The number of parameter values that can be selected from the set, the selectable parameter values themselves and the associated presentation of the parameter values are dependent on the parameter type of the drive system parameter. For example, the drive system parameter may be of the "input" parameter type, wherein selectable parameter values "analogue", "digital", "not connected" etc. are assigned to said parameter type, for example. A further parameter type may be "output", for example, wherein selectable parameter values "voltage", "current", "PWM", "not connected" etc. may be assigned to said parameter type, for example.

A substantially more simple input can be achieved, in particular in the case of a larger number of selection possibilities, by means of the method according to the invention, wherein the customary image can be retained simultaneously in the case of a small number of selection possibilities. This simplifies the configuration of electrical drive systems significantly.

The threshold value preferably corresponds to a maximum number of parameter values that can be displayed. It is therefore possible to use the search field precisely in the case in which more than the maximum presentable number of parameter values can be selected, whereas otherwise the customary display is used.

The threshold value can have a value between 10 and 20, in particular 15, for example.

When the dialogue containing the search field is displayed, the parameter values from the set are preferably simultaneously displayed in part or in full. This allows the user to view at least some of the possible parameter values, which facilitates orientation.

When the dialogue is displayed, a scrollable selection list that can be used to scroll through all the parameter values is preferably displayed. This facilitates the selection of a specific parameter value.

When the character string is input, the parameter values that contain the character string are preferably displayed immediately following a respective input. This allows fast operation without unnecessary delays.

In accordance with one embodiment, the input that is assigned to a parameter value is effected by clicking on a displayed parameter value using a mouse pointer. In accordance with one embodiment, the input that is assigned to a parameter value can likewise be effected by moving towards the parameter value with a marker that is movable between the displayed parameter values, in particular by means of keys, such as for example cursor keys, and by actuating a confirmation key. This allows simple and reliable selection of a specific parameter value.

The method and/or the comparison step and the following steps are preferably executed in response to an activation of a field, in particular a click on the field using a mouse pointer. This corresponds to a typical user input, which indicates that the user wants to select a parameter value. It is thus useful to execute the method or the corresponding steps at precisely this moment.

In accordance with one embodiment, the dialogue is a modal dialogue. This allows the suppression of other functions, for example on a display, while the user selects a parameter value, which avoids distractions and incorrect inputs.

The invention further relates to a machine with a control device, a display and an input device. A set of parameter values of a drive system parameter can be set on the machine. The control device is configured to execute a method according to the invention. In this case, it is possible to refer back to all the described embodiments and variants. The dialogue is displayed on the display and the input is effected by way of the input device.

The machine is therefore preferably embodied to execute the method according to the invention, by means of which it is possible to achieve the advantages already described further above.

The machine may be, in particular, a machine that comprises an electrical drive system or is an electrical drive system.

The invention further relates to a non-volatile computer-readable storage medium on which program code is stored, where a processor executes a method according to the invention upon execution of said program code. In this case, it is possible to refer back to all the described embodiments and variants.

Generally it should be mentioned that, in the case of a smaller number of possible texts, the new dialogue or the control may behave as known from the prior art. In the case of a larger number, a modal dialogue or else a non-modal dialogue can be displayed after clicking on the control. In addition to the selection list with the many texts, an input field is additionally provided in said modal dialogue and can be used to filter the text list. At first, the field is typically empty. As soon as the user performs input operations here, the selection list is filtered such that only those texts that contain the text of the input field appear. Generally, the list is reduced quite considerably after a few characters have been input and the selection of the appropriate entry becomes simple. After double-clicking on the appropriate entry or another kind of selection, for example using an OK key, the modal dialogue closes and the selected text or parameter value appears in the standard control.

It should be mentioned that, instead of an already-mentioned modal dialogue, an arbitrary search text can also be input, for example directly at the location of the control, said search text filtering and thereby shortening the expanded list.

In accordance with one possible embodiment, the response of the control or of the dialogue is not used directly on a user interface but the response is used, for example, in a field of a table control, which likewise enables access to a parameter value of a drive system parameter of this type.

A person skilled in the art will gather further features and advantages from the exemplary embodiment described below with reference to the appended drawing, in which:

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 shows a dialogue, which may appear in one embodiment of the method according to the invention.

DETAILED DESCRIPTION OF THE DRAWINGS

FIG. 1 shows a modal dialogue 10, which may be displayed when a method according to the invention is executed. The method may be executed, in particular, by a drive system on which a number of parameter values of one or more drive system parameters can be set. In this case, the drive system may have, in particular, a display device such as, for example, a display, and an input device such as, for example, a keyboard and/or a mouse.

The modal dialogue 10 is displayed, in particular, when a user clicks on a control field or a control and it is determined that the number of possible parameter values to be selected is larger than a predetermined threshold value. The predetermined threshold value may correspond, in particular, to a number of parameter values that is the maximum that can be displayed in a specific field.

As shown, the dialogue 10 has a search field 20 and, underneath the search field, a list 30. In principle, all the possible parameter values can be selected using the list 30, wherein only some of the possible parameter values are actually displayed. In order to be able to scroll through all the parameter values, a scroll bar 35 is arranged on the right next to the text field. It is therefore not possible to display all the possible parameter values simultaneously, but it is possible to move towards them by use of the scroll bar.

When a text is input into the search field 20, the parameter values are filtered and only those that contain the input text are displayed. The text therefore acts as a search string. In this way, after only a few letters have been input, the list can normally be reduced to such an extent that the desired parameter value can be unambiguously identified.

Incorrect inputs can be prevented effectively by using the method according to the invention and/or the dialogue field 10 shown. Furthermore, operation is facilitated and is effected significantly more quickly than in the case of embodiments according to the prior art.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for configuring an electrical drive system, wherein, in order to configure the electrical drive system, a parameter value of a drive system parameter is selected from a set of selectable parameter values of the drive system parameter, wherein the method comprises the steps of:
   determining a number of parameter values that are selectable from the set;
   comparing the number with a threshold value;
   when the number is smaller than the threshold value or equal to the threshold value, displaying a list containing all the parameter values that are selectable from the set;
   when the number is larger than the threshold value, displaying a dialogue containing a search field, wherein, when a character string is input into the search field, only those parameter values that are selectable from the set and that contain the character string are displayed;
   receiving an input, which is assigned to a displayed parameter value; and
   selecting the parameter value to which the input is assigned, wherein
      when the dialogue containing the search field is displayed, the parameter values from the set are simultaneously displayed in part or in full, and
      when the dialogue is displayed, a scrollable selection list that is usable to scroll through all the parameter values is displayed.

2. The method according to claim 1, wherein
the threshold value corresponds to a maximum number of parameter values that are displayable.

3. The method according to claim 1, wherein
when the character string is input, the parameter values that contain the character string are displayed immediately following a respective input.

4. The method according to claim 1, wherein
the input that is assigned to a parameter value is effected by clicking on a displayed parameter value using a mouse pointer.

5. The method according to claim 1, wherein
the input that is assigned to a parameter value is effected by moving towards the parameter value with a marker that is movable between the displayed parameter values and by actuating a confirmation key.

6. The method according to claim 1, wherein at least one of:
the method, the comparison step and its following steps, are executed in response to an activation of a field by a click on the field using a mouse pointer.

7. The method according to claim 1, wherein
the dialogue is a modal dialogue.

8. A machine, comprising:
a control device;
a display; and
an input wherein, wherein a parameter value of a drive system parameter can be set on the machine,
wherein the control device is configured to execute the method according to claim 1, and
wherein the dialogue is displayed on the display and the input is effected by way of the input device.

9. A method for configuring an electrical drive system, wherein, in order to configure the electrical drive system, a parameter value of a drive system parameter is selected from a set of selectable parameter values of the drive system parameter, wherein the method comprises the steps of:
determining a number of parameter values that are selectable from the set;
comparing the number with a threshold value;
when the number is smaller than the threshold value or equal to the threshold value, displaying a list containing all the parameter values that are selectable from the set;
when the number is larger than the threshold value, displaying a dialogue containing a search field, wherein, when a character string is input into the search field, only those parameter values that are selectable from the set and that contain the character string are displayed;
receiving an input, which is assigned to a displayed parameter value; and
selecting the parameter value to which the input is assigned, wherein
the input that is assigned to a parameter value is effected by moving towards the parameter value with a marker that is movable between the displayed parameter values and by actuating a confirmation key.

* * * * *